US010191557B2

(12) United States Patent
Koomen et al.

(10) Patent No.: US 10,191,557 B2
(45) Date of Patent: Jan. 29, 2019

(54) USER INTERFACE DEVICE

(71) Applicant: PS-Tech B.V., Amsterdam (NL)

(72) Inventors: Wilhemus Josephus Koomen, Amsterdam (NL); Marc Frederik Lausberg, Amsterdam (NL); Arjen Johan Brinkman, Noordwijkerhout (NL); Jacobus Josephus Adrianus Maria Goris, Roosendaal (NL); Martijn Constant Liem, Amsterdam (NL); Mayssara Telhine, The Hague (NL)

(73) Assignee: PS-Tech B.V., Amsterdam (NL)

( * ) Notice: Subject to any disclaimer, the term of this patent is extended or adjusted under 35 U.S.C. 154(b) by 30 days.

(21) Appl. No.: 15/399,776

(22) Filed: Jan. 6, 2017

(65) Prior Publication Data
US 2017/0199577 A1    Jul. 13, 2017

(30) Foreign Application Priority Data
Jan. 8, 2016  (NL) ...................................... 2016075

(51) Int. Cl.
*G06F 3/01*    (2006.01)
*G01C 19/5776*    (2012.01)
(Continued)

(52) U.S. Cl.
CPC ......... *G06F 3/017* (2013.01); *G01C 19/5776* (2013.01); *G01L 1/16* (2013.01);
(Continued)

(58) Field of Classification Search
None
See application file for complete search history.

(56) References Cited

U.S. PATENT DOCUMENTS

| | | | | |
|---|---|---|---|---|
| 4,917,516 A | * | 4/1990 | Retter | .................. G06F 3/0234 345/163 |
| 2006/0227108 A1 | * | 10/2006 | Meyer | ................. G06F 3/03543 345/163 |

(Continued)

FOREIGN PATENT DOCUMENTS

WO    2013014688 A1    1/2013

*Primary Examiner* — Joseph R Haley
(74) *Attorney, Agent, or Firm* — Nederlandsch Octrooibureau; Lindsey A. Auerbach; Catherine A. Shultz

(57) ABSTRACT

A hand-held unit for a wireless interaction system is provided, the hand-held unit having a spherical, elastic and at least partially transparent outer housing, the housing comprising: a light source; a pressure sensor for determining an external pressure exerted on the hand-held unit; an orientation sensor for determining an orientation of the hand-held unit; a wireless communication unit; and a processing unit, wherein the processing unit is configured to operate in at least one of two modes: a two-dimensional mode in which the processing unit operates when the pressure sensor detects that the hand-held unit is rolled along a surface, wherein signals from the orientation sensor are transmitted via the wireless communication unit to an external wireless receiver device; and a three-dimensional mode wherein the light source is emitting light for indicating the position of the hand-held unit to an external light detecting device.

18 Claims, 7 Drawing Sheets

(51) Int. Cl.
  *G01L 1/16*    (2006.01)
  *G01L 1/20*    (2006.01)
  *G06F 3/03*    (2006.01)
  *G06F 3/0346*  (2013.01)

(52) U.S. Cl.
  CPC .............. *G01L 1/20* (2013.01); *G06F 3/0304* (2013.01); *G06F 3/0346* (2013.01)

(56) References Cited

U.S. PATENT DOCUMENTS

| | | |
|---|---|---|
| 2009/0225030 A1 | 9/2009 | Vaananen et al. |
| 2010/0033427 A1 | 2/2010 | Marks et al. |
| 2010/0105480 A1 | 4/2010 | Mikhailov et al. |
| 2013/0027294 A1 | 1/2013 | Nakagawa et al. |
| 2013/0027299 A1* | 1/2013 | Tsukahara ............. G06F 1/1694 345/157 |
| 2014/0168723 A1* | 6/2014 | Lee ................... H04N 1/00127 358/474 |
| 2014/0267033 A1* | 9/2014 | Li ........................ G06F 3/0304 345/158 |
| 2015/0097774 A1 | 4/2015 | Kabasawa et al. |

* cited by examiner

USER INTERFACE DEVICE

FIELD OF THE INVENTION

The invention relates to a wireless interaction system and a hand-held unit for the wireless interaction system, more specifically, a hand-held unit for two-dimensional and three-dimensional interaction in a wireless interaction system.

BACKGROUND OF THE INVENTION

The technology to provide services to users is in continuous development, and so does the way in which these services are provided to the user. When the remote control for the television appeared for the first time, it brought the comfort of the user to a whole new level. When a laser pointer was used in a presentation for the first time, it showed how much easier it became to present information to the audience in a more dynamic manner. When wireless computer mice appeared, they provided a higher degree of freedom and flexibility for the user. People have always interacted with electronic devices, and the amount and variety of electronic devices that people interact with is continuously increasing, being necessary to use different instruments for interacting with different devices: a remote control for interacting with a television, a mouse for interacting with a computer.

There are known devices that can perform more than one of these tasks, such as wireless hand-held devices that can be used as a two-dimensional mouse and also as a three-dimensional interaction device. The functionalities of these devices are however limited and in some cases the amount of sensors that they include increases the battery use considerably. There is therefore a need for an improved wireless hand-held device that can interact with electronic devices.

SUMMARY OF THE INVENTION

The invention provides a hand-held unit for a wireless interaction system, the hand-held unit having a spherical, elastic and at least partially transparent outer housing, the housing comprising: a light source; a pressure sensor for determining an external pressure exerted on the hand-held unit; an orientation sensor for determining an orientation of the hand-held unit; a wireless communication unit; and a processing unit, wherein the processing unit is configured to operate in at least one of two modes: a first mode wherein signals from the orientation sensor are transmitted via the wireless communication unit to an external wireless receiver device; and a second mode wherein the light source is emitting light for indicating the position of the hand-held unit to an external light detecting device.

A hand-held unit according to the present invention efficiently improves wireless interaction systems. The ergonomic shape of the hand-held unit according to the invention allows for a comfortable manipulation that is suitable for both two-dimensional (2D) and three-dimensional (3D) interaction systems. The elastic housing can be deformed by applying an external force (e.g. by squeezing it by hand). When the force is no longer applied, the elastic housing returns to its original form.

Furthermore, the multiple mode operation provides the possibility of adapting the mode of operation to the user's needs while at the same time it can make an efficient use of the battery power. As an example, if the user is to use the hand-held unit as a remote control for a television, the first mode might be used wherein signals from the orientation sensor are transmitted to the television via the wireless communication unit. If, as another example, the user is to operate the hand-held unit as a three-dimensional interaction device with a computer comprising a camera, the second mode might be used, wherein the light source of the hand-held unit emits light for indicating the position of the hand-held unit to the camera. However, it is also possible to use the hand-held unit in two modes simultaneously—the unit may for example be simultaneously rolled (wherein the rolling may e.g. control movement of a pointer on a screen) and tracked via a camera (wherein the detected movement determines the movement of the pointer). The hand-held unit may also frequently switch between modes—e.g. switch to the first mode when a rolling movement is detected, and switch to the second mode when no rolling is detected.

In addition, application software (e.g. on a device that is controlled by the hand-held unit) may determine the mode of the hand-held unit. The application software can also be used to set parameters e.g. sensitivity of the device.

The external wireless receiver device may be a computer, a laptop computer, a tablet computer, a television, or other similar suitable devices that comprise a wireless receiver. The external light detecting device may be a camera or other suitable light detecting device that can detect the movements of the hand-held unit.

The hand-held unit according to the present invention can also operate in a hybrid mode, wherein signals may be transmitted via the wireless communication unit and light may be emitted via the light source.

In an embodiment according to the present invention, the orientation sensor of the hand-held unit is a gyroscope. Gyroscopes are widely used to determine the orientation of objects. Also in electronic devices gyroscope sensors are used in order to measure orientation. The hand-held unit according to the present invention may include one orientation sensor or a plurality of orientation sensors.

In an embodiment according to the present invention, the housing of the hand-held unit further comprises an accelerometer and/or a magnetometer (also called ecompas). Accelerometers are also widely used in electronic devices to measure linear acceleration. A combination of accelerometers and gyroscopes provides an accurate position and orientation determination. The hand-held unit according to the present invention may include one accelerometer or a plurality of accelerometers.

In an embodiment according to the present invention, in the first mode, the processing unit is configured to generate a signal indicating a distance along a surface that the hand-held unit has rolled.

When operating in the first mode, the hand-held unit according to the present invention may function as a 2D interaction device, wherein it can be rolled along a surface and transmit the direction and the distance that it has rolled so that the external wireless receiver device can receive this information. When the hand-held unit is operating in the first mode and is placed on a surface, the pressure sensor detects a constant force being applied to the hand-held unit, and it therefore detects that the hand-held unit is to be operated as a 2D interaction device.

When operating in the first mode, the hand-held unit according to the present invention may function as a 3D interaction device, wherein it can be moved in a three-dimensional space and transmit the distance, direction, and orientation of movements to the external wireless receiver device.

In an embodiment according to the present invention, in the first mode, the processing unit is configured to generate a signal indicating a click when the pressure sensor detects that the hand-held unit is squeezed.

In an embodiment according to the present invention, the pressure sensor is a barometer.

In an embodiment according to the present invention, the light source is configured to change the colour of the emitted light when the pressure sensor detects that the hand-held unit is squeezed. If the hand-held unit is operating in the second mode, the wireless communication unit, the orientation sensor and the accelerometer may be switched off. In this mode, information is transmitted to an external light detecting device, such as a camera. The change of colour of the emitted light when the hand-held unit is squeezed can be interpreted by the receiving device as a click operation.

In an embodiment according to the present invention, the light source is configured to change the colour of the emitted light upon detecting, by at least one of the plurality of sensors, a determined change in the speed of movement of the hand-held unit. A click operation can also be sensed by the hand-held unit upon detecting a specific change in the speed of movement of the hand-held unit. When the unit is moved at a speed higher than a specific value, the colour of the emitted light changes and this change can be interpreted by the receiving device as a click operation.

In an embodiment according to the present invention, the light source of the hand-held unit comprises at least one light emitting diode, LED, or organic LED, OLED.

In an embodiment according to the present invention, the communication unit comprises a Bluetooth transceiver. In an embodiment according to the present invention, the communication unit comprises a wireless local area network, WLAN, transceiver. These are however merely examples, and any other suitable wireless transceiver may be used.

In an embodiment according to the present invention, the diameter is within a range of 40 mm to 150 mm, preferably within a range of 70 mm to 90 mm. The hand-held unit according to the present invention has a size that makes it suitable to be comfortably handled with one hand.

In an embodiment according to the present invention, the outer housing of the hand-held unit is made of a waterproof material. In an embodiment according to the present invention, the outer housing of the hand-held unit is made of a material suitable for repeated sterilisation. The hand-held unit is therefore a robust device that can be used in a safe manner. A hand-held unit that is made for single sterilisation (single use disposable version) can also be envisioned. In that case, the unit can have a removable battery instead of a fixed rechargeable battery, for easy and safe disposal of the used unit.

In an embodiment according to the present invention, the hand-held unit comprises a battery and a charging port. In an embodiment according to the present invention, the charging port is a wired charging port. In another embodiment according to the present invention, the charging port is a wireless charging port.

The invention further provides a wireless interaction system of at least one hand-held unit according to any one of the previous embodiments and an external receiver device, the external receiver device comprising: light detecting means for detecting light from the light source, and wireless receiving means for receiving signals from the wireless communication device.

In an embodiment according to the present invention, the system comprises a second hand-held unit according to any of the previous embodiments. The system of the present invention advantageously allows the interaction with two hand-held units simultaneously. This provides an increased level of freedom and a wider range of possibilities of interaction. By way of example, if the external receiver device is a computer including a camera and a 3D modelling or analysing program is to be executed, the two hand-held units can be used to interact with the program. In this way, a more accurate interaction can be achieved than using a conventional mouse, and a more intuitive user interface is provided to the user. The invention is not limited to a system with two hand-held units. It is also possible to use more than two units, especially when more than one user is cooperating by providing input to the same receiver system.

The invention further provides a method for a hand-held unit according to one of the preceding embodiments in a wireless interaction system, the method comprising the steps of: detecting whether the hand-held unit is in contact with a surface; if the hand-held device is in contact with a surface, entering a two-dimensional mode wherein the at least one hand-held device is rolled along the surface; and if the at least one hand-held device is not in contact with surface, entering a three-dimensional mode wherein the at least one hand-held device is operated in a three-dimensional space. Preferably, the surface is somewhat flat. However, this is not a demanding requirement. For example, a seated person's upper leg is typically sufficiently flat to allow the hand-held unit to operate correctly in the two-dimensional mode.

In an embodiment according to the present invention, the method further comprises, if the hand-held unit enters the two-dimensional mode, transmitting orientation and pressure information using the communication unit.

In an embodiment according to the present invention, the method further comprises, if the hand-held unit enters the three-dimensional mode, transmitting pressure information using the communication unit and light using the light source.

In an embodiment according to the present invention, the method further comprises, if the hand-held unit enters the three-dimensional mode, transmitting a click operation by changing the colour of the light emitted by the light source.

The present invention therefore provides a wireless interaction system that efficiently improves the user experience with a hand-held unit that can operate in 2D and 3D modes, and that can operate in different transmission modes so that an efficient communication and battery usage can be achieved.

The invention further provides a computer program product comprising computer instructions which, when executed on a processing unit of a hand-held unit, cause said processing unit to function according to any one of the previous embodiments.

Additional aspects are disclosed in the following description and in the dependent claims.

BRIEF DESCRIPTION OF THE FIGURES

On the attached drawing sheets.

DETAILED DESCRIPTION

Figure 1:
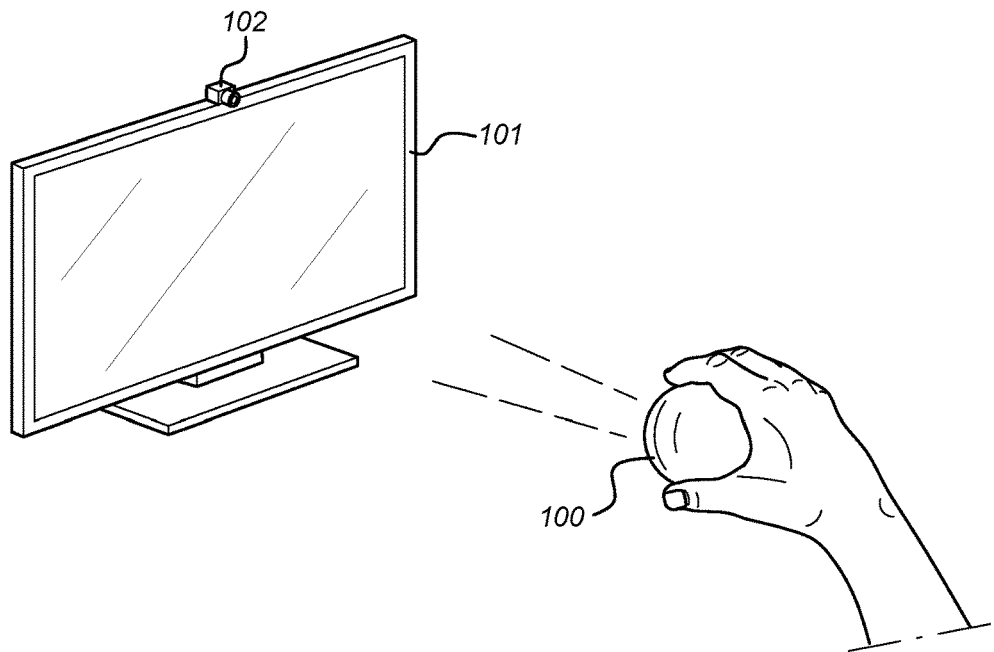
FIG. 1 schematically shows a wireless interaction system according to an embodiment of the present invention

FIG. 1 schematically shows a wireless interaction system according to an embodiment of the present invention.

According to FIG. 1, the hand-held unit 100 of the present invention may operate in two different modes. In a first mode, the hand-held unit, which throughout the description may also be referred to as hand-held device, interaction device, device, or Orby, may send orientation information to a wireless receiver device 101 via the wireless communication unit. In a second mode, the Orby may emit light for indicating its position to a light detecting device such as a camera connected to a computer 102. In this application, for convenience the hand-held unit may be indicated as "Orby" which is the current working title of a product by the Applicant. Obviously, whether or not the device will in fact be marketed under the name "Orby" is not relevant for the technical disclosure in this application. Wherever this application reads "Orby" the term "hand-held unit" may be substituted.

Figure 2:
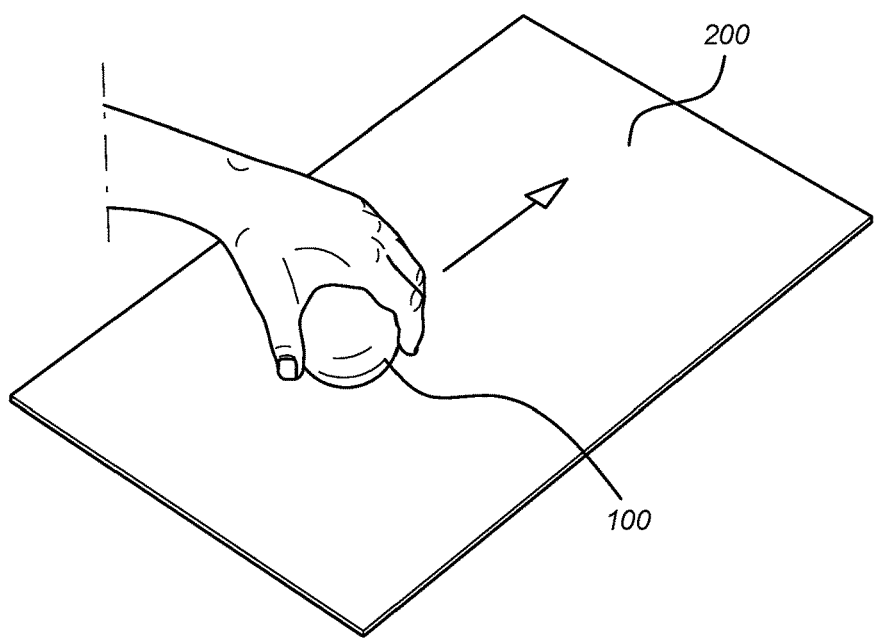
FIG. 2 illustrates a hand-held unit in operation according to an embodiment of the present invention

FIG. 2 illustrates a hand-held unit in operation according to an embodiment of the present invention. When the Orby hand-held unit is operating in a first mode, orientation information is sent to a wireless receiver device. In the embodiment of FIG. 2, the Orby operates furthermore in a 2D mode in which it is rolled along a surface 200, acting as a wireless mouse, with the advantage that it can be rolled along any surface that is (substantially) flat. This is, it can be rolled not only along the surface of a table, but also along the surface of objects as long as they do not present sizable irregularities.

When operating as a 2D interaction device in the first mode, the pressure sensor, or plurality of pressure sensors of the Orby may detect that a constant pressure is being applied to the Orby, which is the own weight of the device being in contact with a surface. When this constant pressure is detected, information is transmitted from the pressure sensor to the processing unit. The processing unit may then instruct the wireless communication unit to transmit this information to a wireless receiver device, so that the wireless receiver device is aware that the Orby is working as a 2D interaction device in the first mode. The wireless communication unit may be further instructed to transmit information detected by the orientation sensor and by the accelerometer to indicate the orientation and position of the device in the surface. This orientation and position information may be sent regularly from the moment that it is detected that the device is in contact with a surface, or it may be sent only when any of the sensors detect a change in orientation or/and position of the device.

Although the description refers to an orientation sensor and an accelerometer, it should be noted that the device may comprise a plurality of orientation sensors and a plurality of accelerometers. Various sensors may be integrated to from hybrid sensors.

For orientation sensing, a gyroscope, accelerometer, magnetometer, tilt sensor or a combination of the mentioned sensors may be used. The pressure sensor might be a barometer, piezo electric, or resistive pressure transducer.

The pressure sensor may furthermore detect that a change in pressure has been applied to the device, for instance as a result of a squeeze action. This change in pressure is also transmitted via the wireless communication unit so that the wireless receiver device can know that a squeeze action has taken place. The squeeze action may indicate a click operation of the Orby. The squeeze action may also be used to start a connection between the Orby and the wireless receiver device and to determine a starting position. When the Orby is switched on or when it first makes contact with a surface, by squeezing the Orby, this information may be sent to the wireless receiver device that can in turn determine a starting location of the Orby on the wireless receiver device's screen.

Figure 3A:
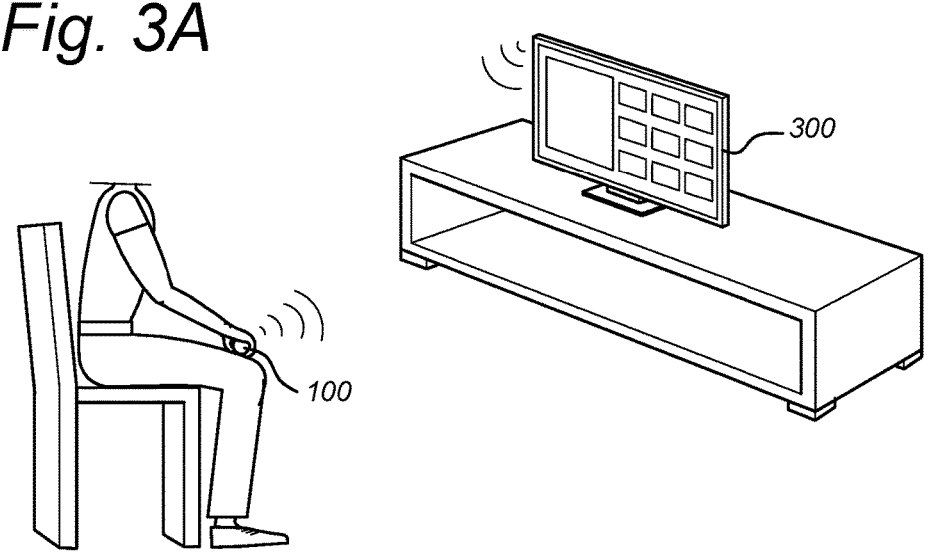
FIG. 3a-3b illustrates a wireless interaction system according to an embodiment of the present invention
Figure 3B:
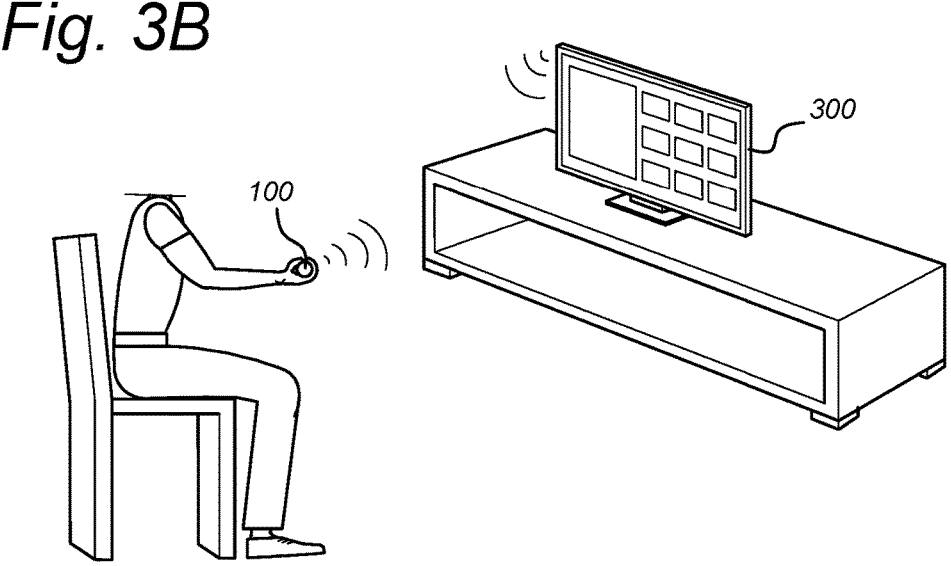

FIG. 3a-3b illustrates a wireless interaction system according to an embodiment of the present invention. As shown in FIG. 3a, the Orby 100 can be used in the first mode as a 2D interaction device being rolled along different surfaces. When the user is comfortably sitting in a sofa while watching television, the Orby can be used as a remote control in order to navigate through the different menus that the television 300 includes. The Orby can furthermore perform all the functions of a traditional remote control: a change of channel or volume can be indicated by a fast movement of the Orby in a specific direction. For example, if the user rolls the Orby forward at a speed higher than a specific value, the volume may be raised. If the Orby is similarly rolled backwards, the volume may be lowered. If the Orby is similarly rolled to the right, the channel may be changed forward and if it is rolled to the left the channel may be changed backwards. This is however merely an example of how the Orby can be used as a remote control, and these and other functions can be agreed and known by the receiver device in advance, so that when the receiver device, such as the television, receives information about specific changes in speed or direction of movement of the Orby, it knows how to translate this information into actions on the screen.

When operating in the first mode, the Orby 100 may also be used as a 3D interaction device. That is, it may be used in a three-dimensional space to interact with the wireless receiver device. As shown in FIG. 3b, the Orby 100 can act as a remote control for the television 300 without being in contact with a surface. The gyroscopes and accelerometers may send information about orientation and position of the Orby to the television and a higher degree of freedom can be achieved. As an example, the Orby may be used to navigate through menus of the television when moved along a plane substantially parallel to the floor, and it can be used to change the channel, the volume, the brightness or other parameters when moved along a plane substantially perpendicular to the floor. A click operation may be sent as a change of pressure detected by the pressure sensors. This is however only an example, and different combinations and actions may be used, which can be specified and programmed into the wireless receiver device in advance.

The spherical shape of the Orby, its size and lightness and its elastic outer housing make it an ergonomic device that can be easily handled. It is furthermore robust and resistant to falls, and it is easy to hand over to another person since it can be easily thrown and caught, which also makes the Orby a user-friendly and appealing device.

Figure 4:
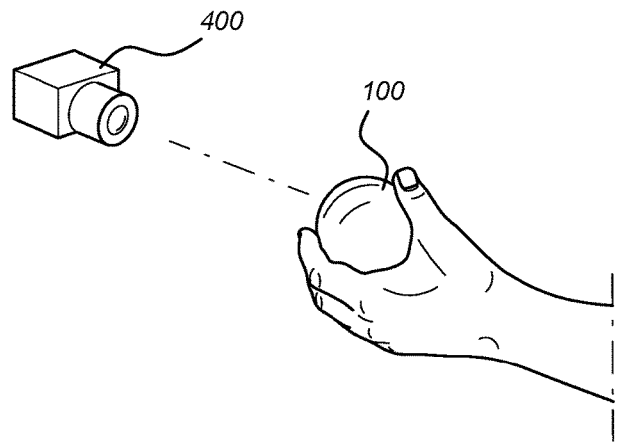
FIG. 4 shows a hand-held unit in operation according to another embodiment of the present invention

FIG. 4 shows a hand-held unit in operation according to another embodiment of the present invention. The Orby according to FIG. 4 may operate in a second mode, wherein the light source may emit light to communicate with an external light detecting device. The light detecting device may be a camera integrated in a laptop computer or in a tablet computer, a web camera connected to a computer or a television, or the like. The light detecting device may also be a light detecting device that does not detect movement but only change in colour, as a low-cost variant with limited functionality. The light source may comprise one or a plurality of light emitting diodes (LEDs) or organic LEDs (OLEDS), or any other suitable light emitting element.

If the Orby is operating only in the second mode, then its position may be determined by the light detecting device 400, preferably a camera. The gyroscopes and accelerometers may be unused in this mode, thereby saving power. The pressure sensors may however be used to sense changes in pressure, so that when the Orby 100 is squeezed the change in pressure is detected and transmitted to the processing unit, which will then request the light source to change the colour of the emitting light.

Before the Orby is used in the second mode, its position may need to be calibrated with the camera 400, as illustrated in FIG. 4. When the Orby is detected by the camera, the initial position is determined and from there the movements of the Orby can be detected.

Figure 5A:
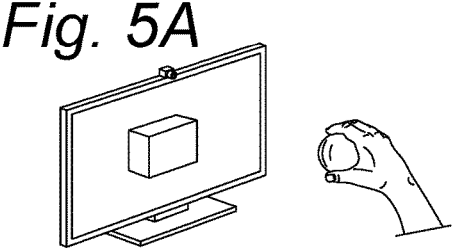
FIG. 5a-5d represents different stages of operation of a hand-held unit in a wireless interaction system according to an embodiment of the present invention
Figure 5B:
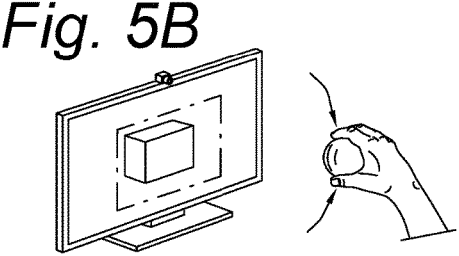
Figure 5C:
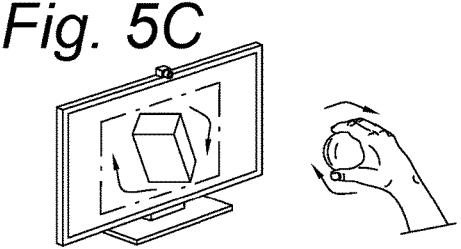
Figure 5D:
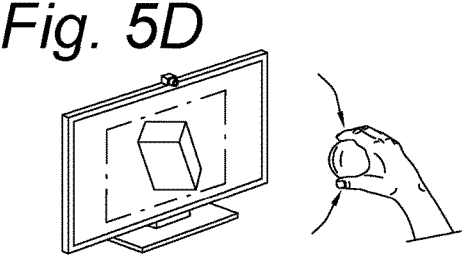

FIG. 5a-5d represents different stages of an operation of a hand-held unit according to another embodiment of the present invention. In the stage of FIG. 5a, the Orby is identified and its position is calibrated by the light detecting device. In the embodiment of FIG. 5a the light detecting device is a camera connected to a computer, but it can be a camera integrated in a laptop, a tablet computer or any other suitable electronic device. Once the Orby is calibrated, its position and movements may be visible in the screen of the computer. In an embodiment according to the present invention, the Orby is used as interaction device to control and manipulate 3D objects in the screen of the computer, such as in a 3D modelling or analysing program. In the stage shown in FIG. 5b, when the user wishes to select an object, the user may squeeze the Orby, which will change the colour of the emitted light and this change can be detected by the camera. In the stage shown in FIG. 5c, once the object is selected, by moving and spinning the Orby in any direction within the three-dimensional space, the object in the screen will also move with a similar direction, orientation and speed. In the stage shown in FIG. 5d, once the object is in a desired position, the user may release the object by again squeezing the Orby, which will make the emitted light change the colour once more.

This principle of selecting an object, moving it and releasing it may be applied also to 2D objects displayed on the screen of the receiver. As an example, if the receiver is a computer, a laptop or a tablet, folders, documents or application shortcuts may be selected and moved to different locations. When operating in the second mode, the Orby can thus also act as a mouse. As another example, if the receiver is a television including a camera, the Orby may be used as a remote control also in the second mode, wherein instead of the wireless communication unit transmitting signals, the position, movements and click operations of the Orby may be detected by the camera.

In an embodiment according to the invention, the Orby may operate in a hybrid mode, wherein the wireless communication unit transmits information about the orientation and position of the device to a wireless receiver unit, and the light source emits light to a light detecting unit. In this embodiment, if the light detecting unit is a camera, the position and movement of the Orby may also be detected by the camera. This hybrid mode may be used for operations that require a high level of accuracy, so that the position and movement of the Orby are received by the receiver device both wirelessly, from the sensors information, and through the camera. The receiver device may then combine the information received from both sources and determine a more accurate position of the Orby.

Figure 6:
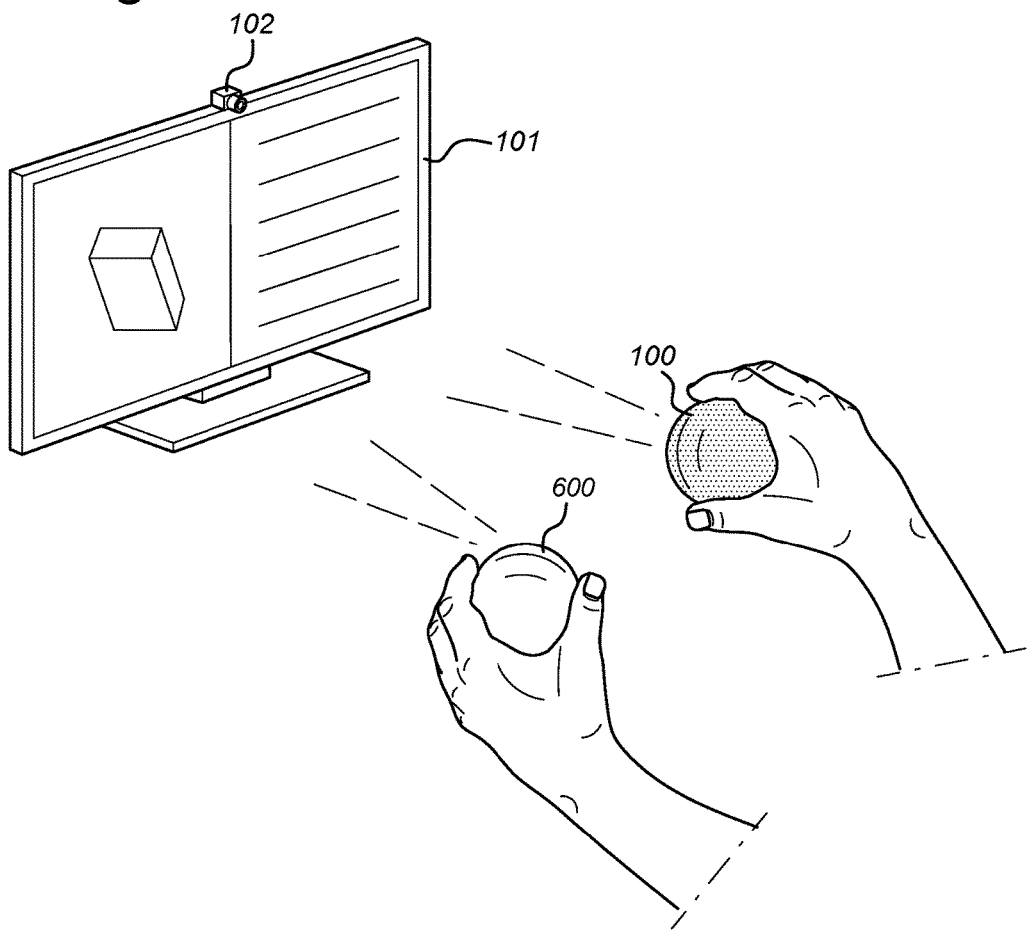
FIG. 6 illustrates a wireless interaction system according to another embodiment of the present invention

FIG. 6 illustrates a wireless communication system according to another embodiment of the present invention. The wireless interaction system may comprise two hand-held devices, this is, two Orby devices. In an embodiment according to the invention, main Orby 100 and secondary Orby 600 may be used simultaneously. When two Orby devices are used simultaneously, they may both operate in the same mode or they may operate in different modes, as explained below.

Both Orby devices may operate as 2D interaction devices in the first mode. In this embodiment, each Orby device has one identifier, and each of them transmits information to the wireless receiver device 101 indicating its identifier. In this embodiment, each Orby device may act as a 2D mouse or 2D remote control, as already explained in the embodiments relating to FIGS. 2 and 3 above. This is, each Orby device may act as a mouse, so that both can be used simultaneously to perform complementary actions. Both Orby devices may also be used as remote controls for a television, wherein the main Orby 100 may be used to control the television menus and the secondary Orby 600 may be used to control the channels or volume. According to this embodiment, both Orby devices may also be used to control the same parameters, so they can be operated by two users simultaneously.

Both Orby devices may operate as 3D interaction devices in the first mode. Each Orby device has one identifier. In this embodiment, each Orby device may act as a 3D mouse or 3D remote control, as already explained in the embodiments relating to FIGS. 2 and 3 above.

Both Orby devices may operate in the first mode, but one of them may operate as a 2D interaction device and the other may operate as a 3D interaction device. As an example, one Orby device may be used by one user as a 3D remote control for the television, and the other Orby may be used by another user as a 2D remote control. Since each Orby device sends its own signals and its own identifier, the information that they sent may be processed in the receiver device and translated into the proper actions.

Both Orby devices may operate in the second mode. In this embodiment, each Orby device may emit light in a different colour, and the colour acts as an identifier so that the light detecting device 102 can distinguish them.

Both Orby devices may operate in an hybrid mode as explained above. This mode involves the highest battery usage, but it also provides the highest level of accuracy, and therefore it may be desirable for specific operations, such as for 3D modelling or analysing computer programs.

It is also possible that each Orby device operates in a different mode: one Orby device may operate in a 2D or 3D first mode and the other Orby device may operate in a second mode, or one Orby device may operate in a 2D or 3D first mode and the other Orby device may operate in an hybrid mode.

There are therefore multiple possibilities in the modes of operation of the system when two Orby devices are used simultaneously.

Figure 7:
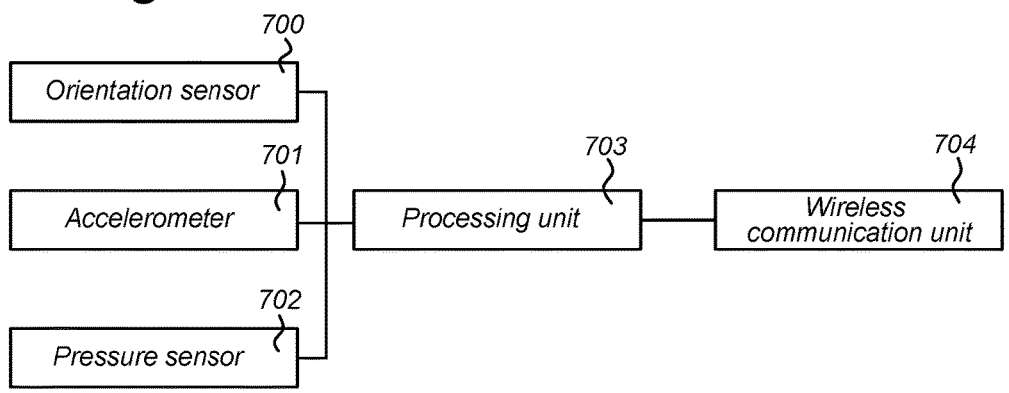
FIG. 7 shows a diagram of the functional units of a hand-held unit according to an embodiment of the present invention

FIG. 7 shows a diagram of the functional units of a hand-held unit according to an embodiment of the present invention. A hand-held unit according to an embodiment of the present invention includes a plurality of sensors, a processing unit 703 and a wireless communication unit 704. Among these sensors there is at least one orientation sensor 700, which preferably is a gyroscope, configured to sense the orientation of the hand-held unit and send it to the processing unit. The hand-held unit may further comprise at least one accelerometer 701, to sense the physical acceleration of the hand-held unit and send it to the processing unit. The hand-held unit may further comprise at least one pressure sensor 702, which preferably is a barometer, configured to sense pressure applied to any point in the surface of the hand-held device and send it to the processing unit. The processing unit 703 is configured to process the information received from the multiple sensors and to send it to the wireless communication unit 704, which is in turn configure to properly convert this information in signals and to wirelessly transmit this signals to a receiver.

FIG. 8a-8d shows different views of a hand-held unit 100 according to an embodiment of the present invention. The Orby according to the present invention has an outer housing of a spherical or substantially spherical shape, in order to optimize its ergonomics. The outer housing has a diameter in a range between 50 mm and 140 mm. Preferably, the diameter is in a range between 70 mm and 90 mm and more preferable it is 80 mm, in order to provide a size that makes it easy to be handled with one hand.

The outer housing of the hand-held unit is made of an elastic material, that can allow the hand-held unit to be squeezed and slightly deformed but that can recover its original shape. The material of the outer housing may also be at least partially transparent. This is because it is necessary that the light emitted from the light source located within the hand-held unit can be transmitted outside the hand-held device.

The material of the outer housing may be waterproof and suitable for sterilization, so that it adds robustness and safety to the hand-held unit. In an embodiment according to the present invention the material of the outer housing contains some form of silicone. Because the hand-held unit is easily cleaned and sterilized, applications in an environment where sterility is important (e.g. a surgery) are possible. The Orby can for example be used by a medical professional to control a medical device.

Figure 8A:
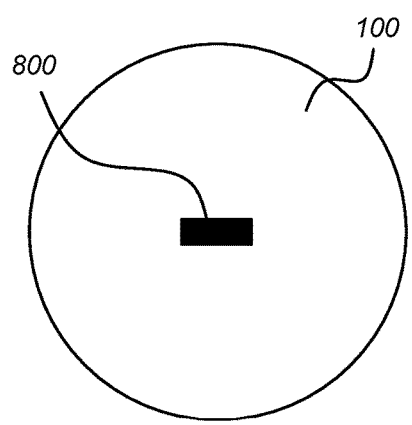
FIG. 8a-8d show different views of a hand-held unit according to an embodiment of the present invention

The hand-held unit according to the present invention uses the power supplied by a battery located within the hand-held unit. The outer housing of the Orby may therefore have a hole wherein a charging port or charging pad is located. In an embodiment according to the present invention, as shown in FIG. 8a, the Orby is charged with a cable, and therefore a charging port 800 is located in the outer housing. The size of the outer port can vary, but is preferably small so that it does not affect the harmony and smoothness of the outer housing.

Figure 8B:
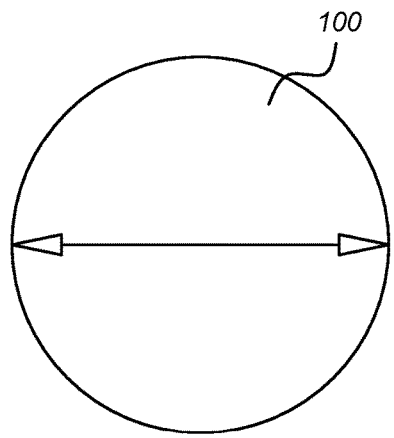
Figure 8C:
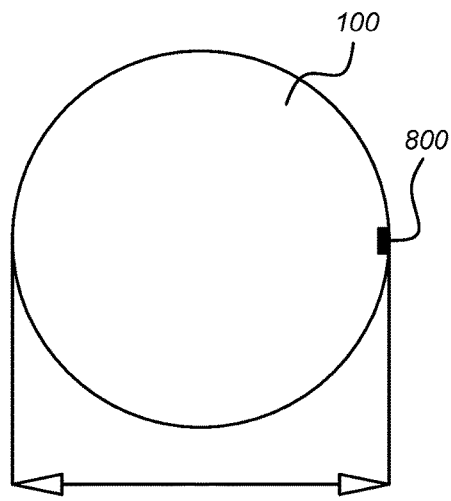
Figure 8D:
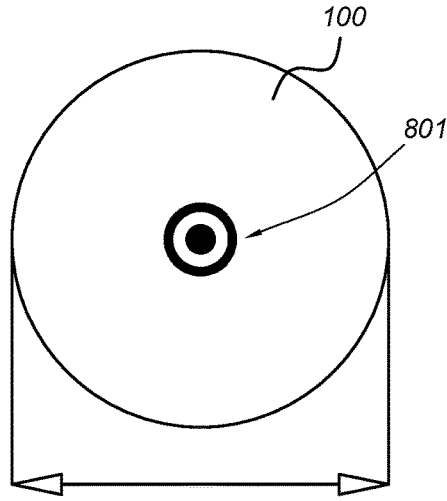

In another embodiment according to the invention, as shown in FIG. 8b, the hand-held unit is wirelessly charged, and conductive charge pads 800 are located in the outer housing. The Orby may also be provided with a connector 801 for connecting a charging current (FIG. 8d).

Figure 9:
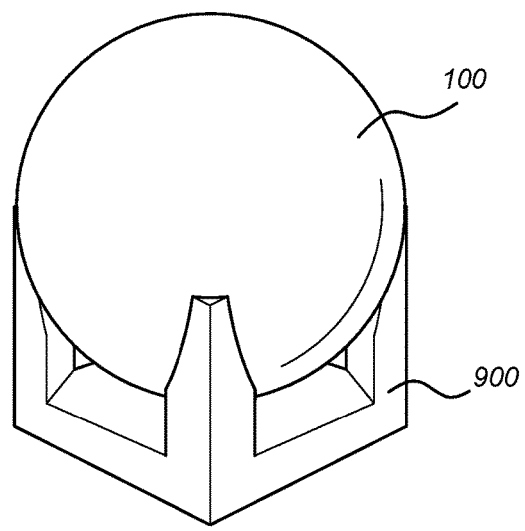
FIG. 9 illustrates a hand-held unit in a charging state according to an embodiment of the present invention
Figure 10A:
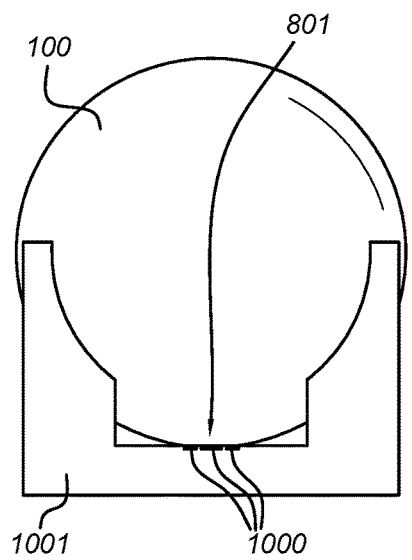
FIG. 10a-10b shows different views of a hand-held unit in a charging state according to an embodiment of the present invention
Figure 10B:
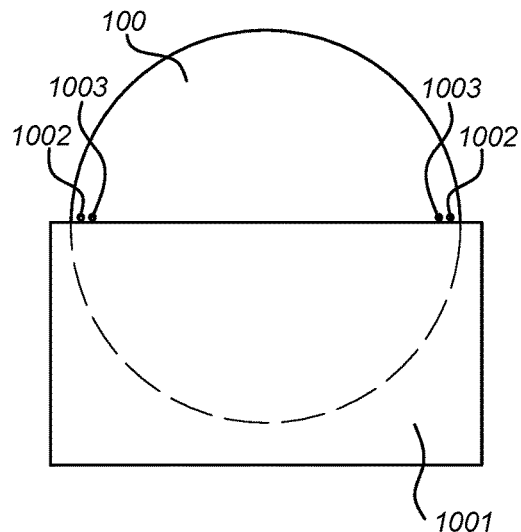

FIGS. 9 and 10a-10b illustrate a hand-held unit in a charging state according to an embodiment of the present invention. In order to be charged, the hand-held unit may be placed on a charging unit 900 that can at the same time support the hand-held unit so that it is safely fastened. The charging unit may also be used as a base 1001 where the Orby may be place when not in used. If the hand-held unit is to be charged with a cable, the charging unit may include a port that can be connected to the charging port of the hand-held device. If the hand-held unit is to be charged wirelessly, the charging unit may include conductive charging pins 1000 to be brought in contact with the conductive charging pads of the hand-held unit. The charging unit may further include a power port through which it can be connected to the power. An alternative inductive wireless charging system involves induction coil 1003 in the Orby and induction coil 1002 in the base, as shown schematically in FIG. 10b.

Figure 11:
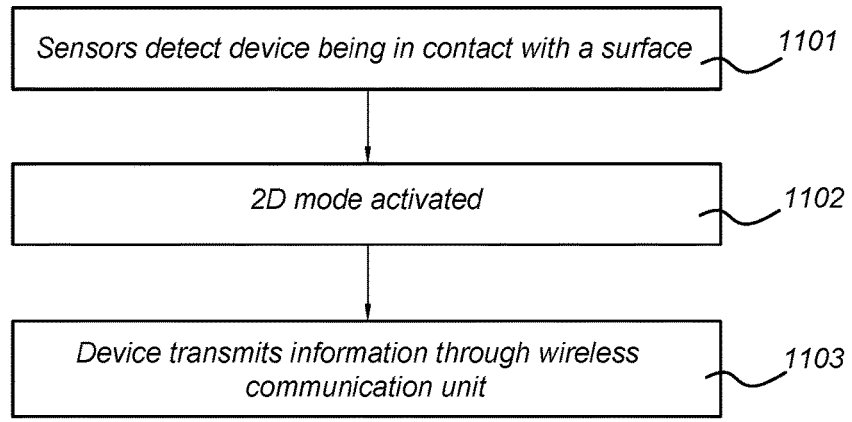
FIG. 11 illustrates a flowchart describing an operation mode according to an embodiment of the present invention

FIG. 11 shows a flowchart describing an operation mode according to an embodiment of the present invention. When the Orby is in contact with a surface, the pressure sensor or pressure sensors detect 1101 that a constant pressure is being applied to the Orby. This information is sent to the processing unit which determines that the Orby is to be operated as a 2D interaction device, and therefore the processing unit activates 1102 the 2D mode. While the Orby is operated in the 2D mode, it transmits 1103 sensor information through the wireless communication unit. This is, information about the orientation sensed by the gyroscope or other orientation sensor, the acceleration sensed by the accelerometer and the pressure sensed by the barometer or other pressure sensor is sent to an external wireless receiver device using the wireless communication unit. In this mode, the Orby may not use the light source to emit light to an external light detecting device. However, the light source may emit light in this mode as to provide a dynamic and user-friendly experience, even though this light will not be detected by a light detecting device.

Figure 12:
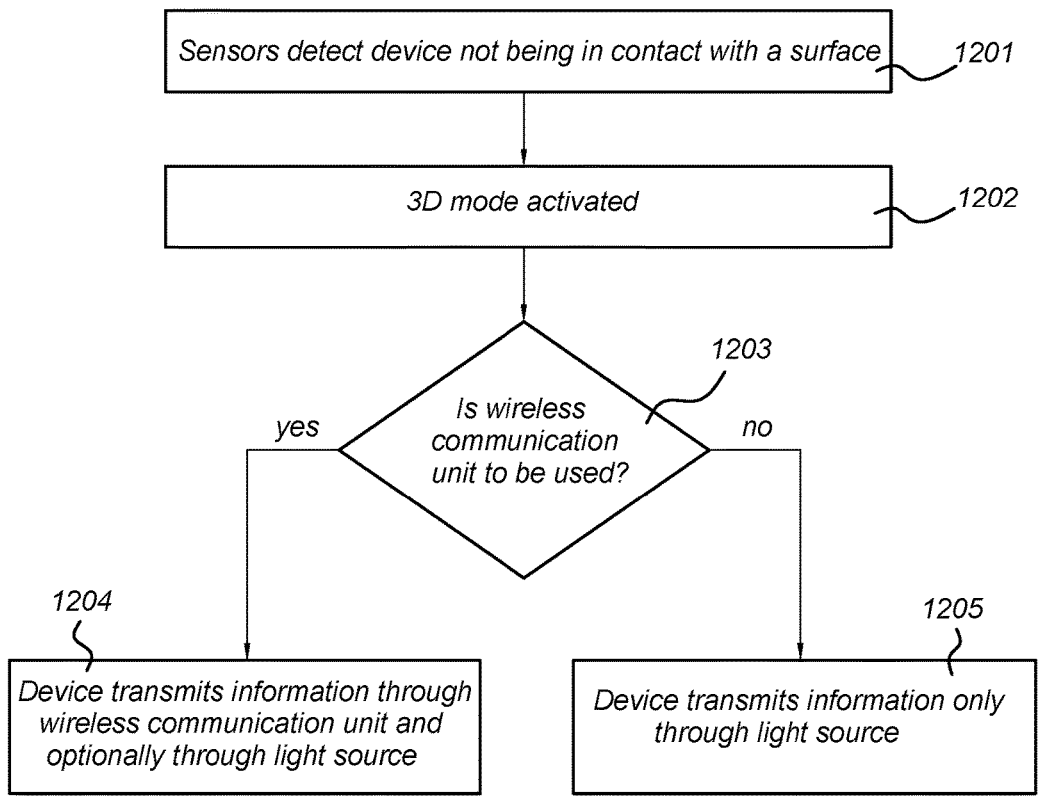
FIG. 12 illustrates a flowchart describing an operation mode according to another embodiment of the present invention.

FIG. 12 shows a flowchart describing another operation mode according to an embodiment of the present invention. When the Orby is not in contact with a surface, the pressure sensor or sensors detect 1201 that the Orby is being held and that pressure is sensed only in specific points of the device. This information is sent to the processing unit which in turn determines that the Orby is to be operated as a 3D interaction device, and therefore the processing unit activates 1202 the 3D mode. When operating in the 3D mode, the Orby may communicate with receiver devices using the wireless communication unit, the light source, or both.

In an embodiment according to the invention, the wireless communication unit is configured to receive signals from a receiver device. If, after being switched on, the wireless communication unit receives a signal from a wireless receiver device, then the processing unit determines that the communication is to be taken place with a wireless receiver device and that the wireless communication unit is to be used, switches on the sensors and the Orby enters a first mode in which it transmits 1204 information through the wireless communication unit. If the Orby is to operate in a hybrid mode, the light source may also emit light and the communication can take place using both the wireless communication unit and the light source.

If a specific period of time lapses since the Orby has been switched on and the wireless communication unit does not receive a signal from a wireless receiver device, the processing unit determines that the Orby will transmit 1205 information using the light source and therefore it enters a second mode, wherein the wireless communication unit, the gyroscopes and the accelerometers may be switched off.

In another embodiment according to the present invention, the Orby does not wait for a specific period of time from the moment it is switched on, but from the moment a pressure change is felt meaning that the Orby is being held. If the wireless communication unit receives a signal from a wireless receiver within said specific time, the processing unit determines that the wireless communication unit is to be used to transmit information. If no signal is received, the processing unit determines that the light source is to be used to transmit information.

In an embodiment according to the present invention, the user himself can select whether the Orby is to operate in a first mode or in a second mode, this is, whether the Orby is to transmit using the wireless communication unit or using the light source. This selection may be performed by using selection buttons that may be located in the outer housing of the Orby, preferably close to the charging port or charging pads so as to maintain the rest of the outer surface empty and allow for easiness of use, without creating inconvenience for the user.

The Orby as described in this application can be used for a number of applications. Mention has been made of control of computers or television devices. The Orby device can for example be used to make music based on gestures, or to control the movement of a remote-controlled device, such as a vehicle, a drone, or a robot. The Orby device can be used to control an avatar in a computer simulation or game.

In the foregoing description of the figures, the invention has been described with reference to specific embodiments thereof. It will, however, be evident that various modifications and changes may be made thereto without departing from the scope of the invention as summarized in the attached claims.

In particular, combinations of specific features of various aspects of the invention may be made. An aspect of the invention may be further advantageously enhanced by adding a feature that was described in relation to another aspect of the invention.

It is to be understood that the invention is limited by the annexed claims and its technical equivalents only. In this document and in its claims, the verb "to comprise" and its conjugations are used in their non-limiting sense to mean that items following the word are included, without excluding items not specifically mentioned. In addition, reference to an element by the indefinite article "a" or "an" does not exclude the possibility that more than one of the element is present, unless the context clearly requires that there be one and only one of the elements. The indefinite article "a" or "an" thus usually means "at least one".

The invention claimed is:

1. A hand-held unit for a wireless interaction system, the hand-held unit having a spherical, elastic and at least partially transparent outer housing, the housing comprising:
   a light source;
   a pressure sensor for determining an external pressure exerted on the hand-held unit;
   an orientation sensor for determining an orientation of the hand-held unit;
   a wireless communication unit; and
   a processing unit,
   wherein the processing unit is configured to operate in at least one of three modes:
   a two-dimensional mode in which the processing unit operates when the pressure sensor detects that the hand-held unit is rolled along a surface wherein signals from the orientation sensor are transmitted via the wireless communication unit to an external wireless receiver device; and
   a three dimensional mode wherein the light source is emitting light for indicating the position of the hand-held unit to an external light detecting device, and
   a hybrid mode, wherein signals from the orientation sensor are transmitted via the wireless communication unit and light is emitted through the light source, so that the position and movement of the hand-held unit are detected as a combination of the information received from the wireless communication unit and the light source.

2. The hand-held unit according to claim 1, wherein the housing further comprises an accelerometer and/or a magnetometer.

3. The hand-held unit according to claim 1, wherein, in the two-dimensional mode and in the hybrid mode, the processing unit is configured to generate a signal indicating a distance along a surface that the hand-held unit has rolled.

4. The hand-held unit according to claim 1, wherein, in the two-dimensional, three-dimensional mode, and hybrid mode, the processing unit is configured to generate a signal indicating a click when the pressure sensor detects that the hand-held unit is squeezed.

5. The hand-held unit according to claim 1, wherein the light source is configured to change the colour of the emitted light when the pressure sensor detects that the hand-held unit is squeezed.

6. The hand-held unit according to claim 1, wherein the light source is configured to change the colour of the emitted light upon detecting, by at least one of the plurality of sensors, a determined change in the speed of movement of the hand-held unit.

7. The hand-held unit according to claim 1, wherein the light source comprises at least one light emitting diode, LED, or organic LED, OLED.

8. The hand-held unit according to claim 1, wherein the communication unit comprises a Bluetooth transceiver or a wireless local area network, WLAN, transceiver.

9. The hand-held unit according to claim 1, wherein the diameter is within a range of 40 mm to 150 mm.

10. The hand-held unit according to claim 1, wherein the outer housing is made of a waterproof material suitable for repeated sterilisation.

11. The hand-held unit according to claim 1, wherein the at least one hand-held unit comprises a battery and a charging port.

12. The hand-held unit according to claim 11, wherein the charging port is a wireless charging port.

13. Wireless interaction system of at least one hand-held unit according to claim 1 and an external receiver device, the external receiver device comprising:
   light detecting means for detecting light from the light source, and
   wireless receiving means for receiving signals from the wireless communication device.

14. Wireless interaction system according to claim 13, the system comprising a second hand-held unit according to claim 1.

15. A method for a hand-held unit, the hand-held unit being according to claim 1, in a wireless interaction system, the method comprising the steps of:
   detecting whether the hand-held unit is in contact with a surface;
   if the hand-held unit is in contact with a surface, entering a two-dimensional mode wherein the hand-held unit is rolled along the surface and wherein signals from the orientation sensor are transmitted via the wireless communication unit to an external wireless receiver device; and if the hand-held unit is not in contact with the surface, entering three-dimensional mode wherein the at least one hand-held unit is operated in a three-dimensional space and wherein the light source is emitting light for indicating the position of the hand-held unit to an external light detecting device, wherein the method further comprises the step of entering an additional mode, a hybrid mode, wherein signals from the orientation sensor are transmitted via the wireless communication unit and light is emitted through the light source, so that the position and movement of the hand-held unit are detected as a combination of the information received from the wireless communication unit and the light source.

16. The method according to claim 15, further comprising, if the hand-held unit enters the two-dimensional mode, the three-dimensional mode, or the hybrid mode, transmitting pressure information using the communication unit.

17. The method according to claim 15, further comprising, if the hand-held unit enters the three-dimensional mode or the hybrid mode, transmitting a click operation by changing the colour of the light emitted by the light source.

18. A non-transitory computer readable storage medium for operating a hand-held unit in two-dimensional mode, in three-dimensional mode, and in hybrid mode, the medium comprising computer instructions stored thereon which, when executed on a processing unit of a hand-held unit, cause said processing unit to perform the steps of:

detecting whether the hand-held unit is in contact with a surface;

if the hand-held unit is in contact with a surface, entering a two-dimensional mode wherein the hand-held unit is rolled along the surface and wherein signals from the orientation sensor are transmitted via the wireless communication unit to an external wireless receiver device; and if the hand-held unit is not in contact with the surface, entering a three-dimensional mode wherein the at least one hand-held unit is operated in a three-dimensional space and wherein the light source is emitting light for indicating the position of the hand-held unit to an external light detecting device, wherein the method further comprises the step of entering an additional mode, a hybrid mode, wherein signals from the orientation sensor are transmitted via the wireless communication unit and light is emitted through the light source, so that the position and movement of the hand-held unit are detected as a combination of the information received from the wireless communication unit and the light source.

* * * * *